La Tourette & Smith,
Brick Machine.

N° 69,683.  Patented Oct. 8, 1867.

Witnesses:
Theo Fusche
J. A. Lewis

Inventors:
A. La Tourette
Seth H. Smith
Per Munn & Co
Attorneys

United States Patent Office.

A. LA TOURRETTE, OF WATERLOO, AND SETH H. SMITH, OF VENICE, NEW YORK.

Letters Patent No. 69,683, dated October 8, 1867.

---

IMPROVED BRICK MACHINE.

---

The Schedule referred to in these Letters Patent and making part of the same.

---

TO ALL WHOM IT MAY CONCERN:

Be it known that we, A. LA TOURRETTE, of Waterloo, in the county of Seneca, and State of New York, and SETH H. SMITH, of Venice, in the county of Cayuga, and State of New York, have invented a new and improved Brick Machine; and we do hereby declare that the following is a full, clear, and exact description thereof, which will enable others skilled in the art to make and use the same, reference being had to the accompanying drawings, forming part of this specification.

The object of this invention is to obtain a simple and cheap machine for pressing and moulding bricks, one which may be operated by a very moderate expenditure of power and still perform its work expeditiously and in a superior manner. In the accompanying sheet of drawings—

Figure 1:
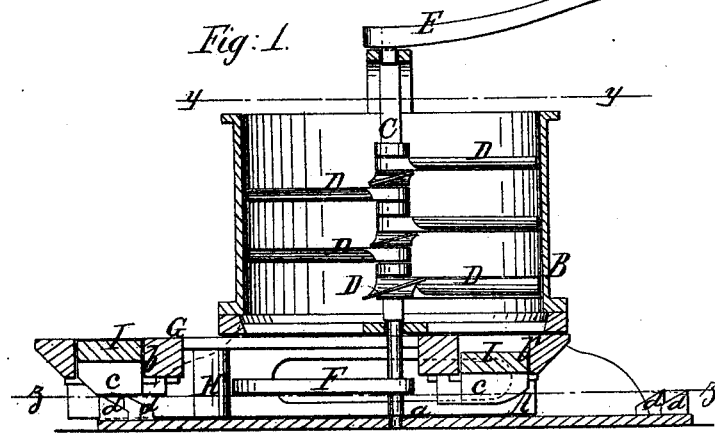
Figure 2:
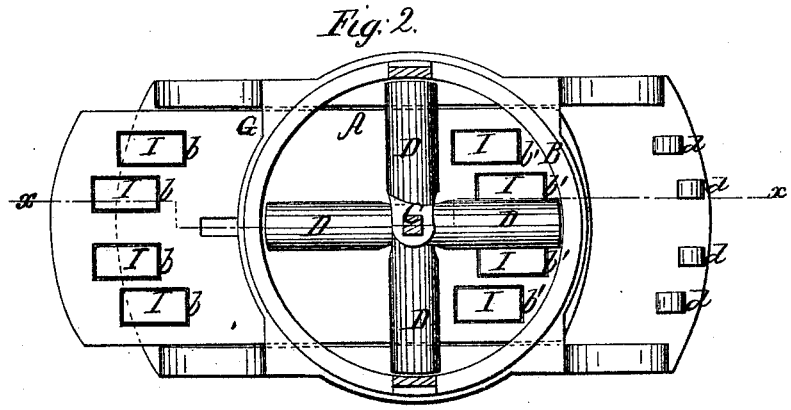

Figure 1 is a vertical section of our invention, taken in the line $x\ x$, fig. 2.

Figure 2, a plan or top view of the same, the mud-mill shaft being in section, as indicated by the line $y\ y$, fig. 1.

Figure 3:
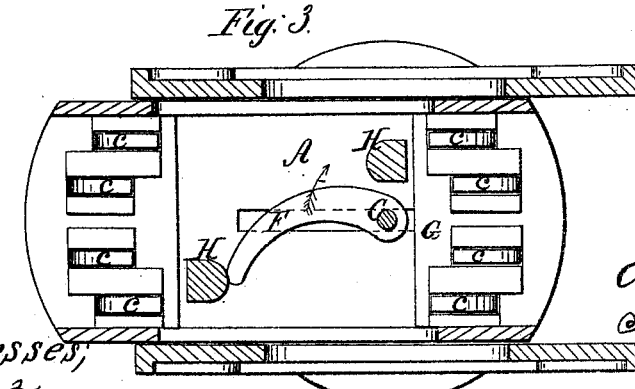

Figure 3, a horizontal section of the same, taken in the line $z\ z$, fig. 1, looking upward.

Similar letters of reference indicate like parts.

A represents a hollow base, on which the mud-mill is placed. This mud-mill is composed of a case, B, of cylindrical or other proper form, through which a vertical shaft, C, passes centrally, said shaft being provided with horizontal radial arms D, slightly inclined in their transverse section so as to have a tendency to press the clay downward while mixing or tempering the same. A sweep, E, is fitted on the upper end of the shaft C, to which sweep the horse is attached. The lower end of the shaft C is stepped in the bottom of the base A, as shown at $a$, in fig. 1, and on shaft $C_1$ within the base A, there is keyed a curved arm, F, the use of which will be presently shown. G represents a sliding or reciprocating bed placed within the hollow base A, and having rectangular openings $b\ b'$ made in it, which serve as moulds. These moulds $b\ b'$ are in the bed G, near its ends, the moulds $b$ being near one end, and $b'$ near the opposite end, and the moulds of each set are in a curve, so that they may all be embraced within the boundary of the case B, in order to be filled with clay. The moulds $b\ b'$ are filled alternately, as they are alternately drawn underneath the case B, and this is effected by the action of the curved arm F against uprights H in the mould-bed G, a space or opening being allowed in said bed to receive the uprights H and allow the arm F to rotate freely. In practice I design to use friction-rollers instead of the uprights. The moulds $b\ b'$ are filled, when underneath the case B, by the pressure of the two lowermost arms D D, both of said arms passing over each set while they are underneath the case. Hence the tempered clay will be firmly compacted within the moulds. In each mould there is placed a plunger, I. These plungers are allowed to rise and fall freely within the moulds, and, when not acted upon from below, resting by virtue of their own gravity in the lower parts of the moulds. Each plunger has a pendent plate, $c$, and these plates pass through slots in the bottoms of the moulds, and, near the termination of each movement of the mould-block, come in contact with pins $d$ in the bottom of the vase, which pins cause the plungers to rise and force out the bricks from the moulds. The upper surfaces of the pins $d$ are slightly bevelled or inclined, as also are the outer ends of the plates $c$ of the plungers, in order that said plates may move or catch upon the upper surfaces of the pins, as will be fully understood by referring to fig. 1. The plungers drop or fall by their own gravity as the plates $c$ pass off from the pins $d$.

What we claim as new, and desire to secure by Letters Patent, is—

The reciprocating mould-bed G, when operated from the vertical shaft C of the mud-mill by means of the revolving curved arm F, and when so arranged that the moulds $b\ b$ are filled at one revolution of the shaft C, as herein shown and described.

A. LA TOURRETTE.
SETH H. SMITH.

Witnesses:
L. H. DAY,
E. A. TAYLOR.